Figure 1:
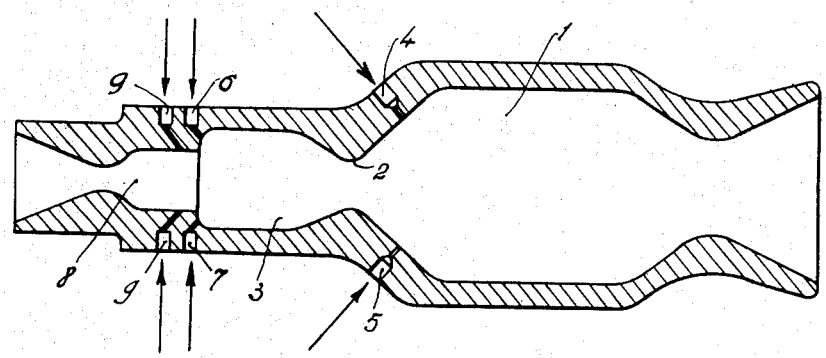

Sept. 21, 1954        H. SCHNEIDER         2,689,454
                       ROCKET ENGINE
Filed April 18, 1951.                    2 Sheets-Sheet 1

Inventor
Hans Schneider
by Malcolm W. Fraser
    attorney

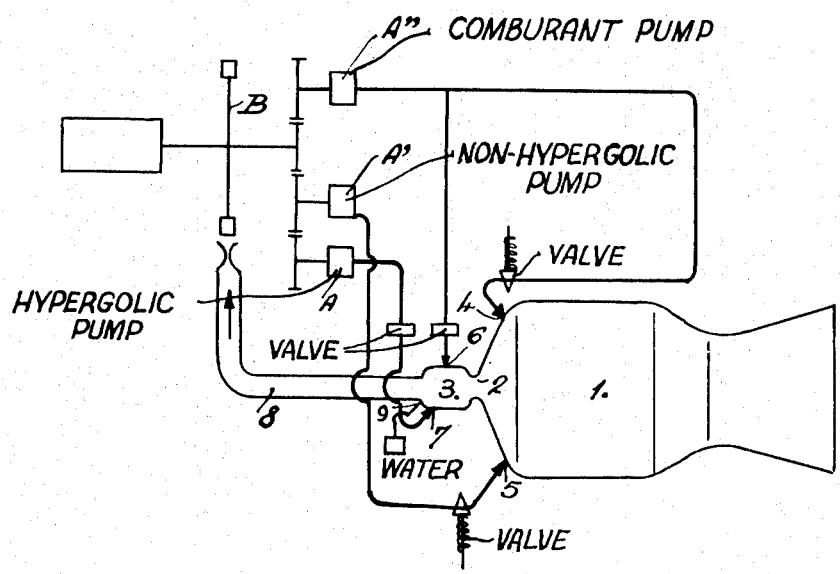

Patented Sept. 21, 1954

2,689,454

UNITED STATES PATENT OFFICE 2,689,454

ROCKET ENGINE

Hans Schneider, Chatenay-Malabry, France, assignor to Societe d'Etude de la Propulsion par Reaction, Villejuif, France, a company of France Application April 18, 1951, Serial No. 221,587

Claims priority, application France May 13, 1950

2 Claims. (Cl. 60—39.14)

The present invention relates to rocket engines using non-hypergolic fuels and more particularly to the devices of this type in which carburants are compressed by pumps acted by a turbine.

When the operating period of a rocket engine is sufficiently great, carburants must be put under pressure by pumps driven by a turbine. In rocket engines built or proposed up to now, the rotation of the turbine is secured by an auxiliary gaseous fluid. The rocket engine must then comprise a plant for the production of this gaseous fluid, and when it is produced by the combustion of a liquid, an ignition system and a flame controlling device. If the turbine is supplied with gas issuing from the combustion chamber, it is necessary to provide means constituted, for example, by a source of compressed air, an electric motor or an air driven turbine, in order to let the machine attain the proper rate at which it operates automatically.

On the other hand, when a jet engine runs with nonhypergolic fuels, it must be provided with a device for igniting the gaseous mixture in the combustion chamber. Such an engine is then rather complex, above all if it comprises a turbine and pumps for the pressuring of carburants.

The invention has for its object to provide a rocket engine which operates with nonhypergolic fuels and is of the type comprising a turbine, however being of a relatively simple construction, the combustion chamber, gas generator and ignition equipment being assembled in one plant.

The following terms, as used in the specification and claims are defined for the purpose of clarity:

Hypergolic carburant is a fuel which reacts spontaneously upon contact with a substance (comburant) which must determine its combustion. Furfurilic alcohol is an example of a hypergolic fuel.

Non-hypergolic carburant is a fuel which requires the production of a spark or the like to effect combustion when in contact with a comburant, an example being chosen.

Carburant and fuel mean the same thing, it being a substance which ignites upon contact with another substance.

Comburant is a substance which causes combustion of a carburant or fuel, nitric acid being an example.

The engine according to the invention is characterized by the fact that it has an ignition chamber which communicates with the bottom of the combustion chamber through a narrow cross-section and also by the fact that the admission of the turbine is connected with the ignition chamber, means being provided for sending hypergolic carburants into the latter chamber and nonhypergolic carburants into the combustion chamber.

On injecting hypergolic carburants in the ignition chamber, the gas from combustion assures the starting of the turbine, and the necessary power for this starting is several times inferior to that which would be necessary for a direct starting, this advantage being so much the more important as the power of the engine is greater.

Pumps are driven by the turbine and the carburants are introduced into the combustion chamber, the mixture being ignited by the hot jet from the ignition chamber. It is then possible to stop the injection of hypergolic carburants into the latter chamber, a part of the gas produced in the combustion chamber crossing the ignition chamber to supply the turbine.

In the drawings,

Figure 1 shows diagrammatically an embodiment of combustion chamber for a rocket engine according to the invention; and Figure 2 is a diagrammatic view showing the assembly of the rocket engine with carburant feeding pumps and the turbine actuating the pumps.

In this embodiment, the bottom of the combustion chamber 1 communicates through a neck 2 with an ignition chamber 3 and is provided with injectors 4 and 5 for a comburant and a non-hypergolic fuel. As shown on Figure 2, a comburant is forced to the injector 4 by a pump A" and the nonhypergolic fuel is forced to the injector 5 by a pump A'. The ignition chamber 3 is provided on its part with injectors 6 and 7 for a comburant and a hypergolic fuel, the hypergolic fuel being handled by a pump A and the comburant by the pump A", as above mentioned. The pumps A, A' and A" are connected to be driven by a turbine B. The inlet of the turbine B is connected to the bottom of the ignition chamber 3 through a channel 8 which has a neck and in which are disposed injectors 9 for a liquid such as water in order to cool the gases and bring them to the proper temperature for their use in the turbine.

On the starting, the gases from combustion produced in chamber 3, go partly into chamber 1 through the neck 2, the speed of these gases reaching the neck being somewhat that of the sound.

The diameter of the neck and the discharge of the carburants in chamber 3 can be determined to have a pressure corresponding to an expansion of pressure suitable to the turbine. During the normal operating, the admission of carburants in chamber 3 is cut off, a part of the gas produced in chamber 1 passing into the said chamber 3 through neck 2, and from this chamber to the turbine through channel 8.

It is clear that one may effect modifications in the above described embodiment without departing from the spirit and scope of the invention such as defined by the appended claims.

What I claim is:

1. A rocket engine comprising a preliminary ignition chamber, a combustion chamber, reduced neck providing a connection between said chambers, a turbine having an inlet communicating with said preliminary ignition chamber, nonhypergolic fuel supply means including a conduit to said combustion chamber, hypergolic fuel supply means including a conduit to said preliminary ignition chamber for supplying hypergolic fuel thereto only during starting, conduit means for supplying comburant to said combustion and preliminary ignition chambers respectively, and pump means operatively connected to said turbine for each of said conduits and conduit means respectively, the gases caused by combustion of hypergolic fuel in the preliminary ignition chamber starting the turbine and the turbine thereafter being driven by gases from the combustion chamber to which now hypergolic fuels are fed by turbine operated pumps.

2. A rocket engine comprising a preliminary ignition chamber, a combustion chamber, a reduced neck providing a connection between said chambers, a turbine having an inlet communicating with said preliminary ignition chamber, nonhypergolic fuel supply means including a conduit to said combustion chamber, hypergolic fuel supply means including a conduit to said preliminary ignition chamber for supplying hypergolic fuel thereto only in starting, condiut means for supplying comburant to said combustion and preliminary ignition chambers respectively, pump means operatively connected to said turbine for each of said conduits and conduit means respectively, and means for injecting liquid coolant into said preliminary ignition chamber for cooling the combustion gases therein, the gases caused by combustion of hypergolic fuel in the preliminary ignition chamber starting the turbine and the turbine thereafter being driven by gases from the combustion chamber to which now hypergolic fuels are fed by turbine operated pumps.

References Cited in the file of this patent

UNITED STATES PATENTS

| Number | Name | Date |
|---|---|---|
| 2,397,659 | Goddard | Apr. 2, 1946 |
| 2,408,111 | Truax et al. | Sept. 24, 1946 |
| 2,450,950 | Goddard | Oct. 12, 1948 |
| 2,523,009 | Goddard | Sept. 19, 1950 |
| 2,523,010 | Goddard | Sept. 19, 1950 |
| 2,523,656 | Goddard | Sept. 26, 1950 |
| 2,531,761 | Zucrow | Nov. 28, 1950 |

FOREIGN PATENTS

| Number | Country | Date |
|---|---|---|
| 477,022 | France | June 24, 1915 |